|| US008765860B2

United States Patent
Tsukamoto et al.

(10) Patent No.: US 8,765,860 B2
(45) Date of Patent: Jul. 1, 2014

(54) INJECTION MOLDING COMPOSITION AND PRODUCING METHOD THEREOF

(75) Inventors: Naoto Tsukamoto, Tokyo (JP); Tomohiko Aida, Tokyo (JP); Shinichi Sakano, Tokyo (JP); Yoshihiko Minachi, Tokyo (JP); Masashi Gotoh, Tokyo (JP); Minao Himeno, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/595,407

(22) Filed: Aug. 27, 2012

(65) Prior Publication Data

US 2013/0079451 A1    Mar. 28, 2013

(30) Foreign Application Priority Data

Sep. 26, 2011  (JP) ................. 2011-209800

(51) Int. Cl.
| | |
|---|---|
| C08K 5/04 | (2006.01) |
| H01F 1/01 | (2006.01) |
| C08K 3/22 | (2006.01) |
| C08L 25/06 | (2006.01) |
| C08L 23/04 | (2006.01) |
| C08L 23/10 | (2006.01) |
| C08L 27/06 | (2006.01) |
| C08L 31/04 | (2006.01) |
| C08L 33/08 | (2006.01) |
| C08L 77/00 | (2006.01) |
| H01F 1/36 | (2006.01) |

(52) U.S. Cl.
USPC ........... 524/430; 524/455; 524/582; 524/585; 524/524; 524/560; 524/606; 524/824; 252/62.51; 252/62.54

(58) Field of Classification Search
CPC ........... C08K 3/22; C08L 25/06; C08L 23/04; C08L 23/10; C08L 27/06; C08L 31/04; C08L 33/08; C08L 33/10; C08L 59/00; C08L 77/00; H01F 1/01
USPC ......... 524/398, 430, 455, 582, 585, 524, 824, 524/560, 606; 252/62.51, 62.54
See application file for complete search history.

(56) References Cited

U.S. PATENT DOCUMENTS

2012/0280167 A1* 11/2012 Yanagida et al. .......... 252/62.55

FOREIGN PATENT DOCUMENTS

| JP | A-62-41759 | 2/1987 |
|---|---|---|
| JP | A-5-33006 | 2/1993 |
| WO | WO 2011115129 A1 * | 9/2011 |

OTHER PUBLICATIONS

D. Tripathi, Practical Guide to Polypropylene, Rapra Technology, Shawbury, UK, 2002, p. 28, Table 14.*
M. Chandra and S. Roy, Industrial Polymers, Specialty Polymers, and Their Applications, CRC Press, Boca Raton, 2008, p. 1-46, Table 1.8.*
MatWeb.com—Material Property Data—Overview of Acrylic, Optical Grade, Molded—Jun. 19, 2013.*
MatWeb.com—Material Property Data—Plaskolite Optix PL-25 Acrylic Resin—Oct. 17, 2013.*
ChemYQ.com—atactic polypropylene—http://chemyq.com/En/xz/xz6/58131fgmae.htm.*
MatWeb.com—Material Property Data—Lanxess Durethan B 30 S 000000 Nylon 6—Jun. 19, 2013.*
MatWeb.com—Material Property Data—LyondellBasell Microthene F FP80000 Polypropylene.*

* cited by examiner

*Primary Examiner* — Ling Choi
*Assistant Examiner* — Ronald Grinsted
(74) *Attorney, Agent, or Firm* — Oliff PLC

(57) ABSTRACT

An injection molding composition, having a small fluctuation characteristic and a better characteristic, is provided. The above composition is the injection molding composition comprising a ferrite powder which is a collection of ferrite particles, a first binder and a second binder. A weight and a specific surface area of the ferrite powders are represented by Wp and S, and a weight and a density of the first binder and the second binder is represented by Wb1, Wb2, and Db1, Db2. A hypothetical thickness Tb1 of the first binder is 2.0 to 15.0, and a hypothetical thickness Tb2 of the second binder is 16.5 to 32.0. In the composition, it is preferable that coated ferrite particles coating the outer circumference of the ferrite particles with the first binder and the second binder exist.

$$Tb1\ [\text{nm}] = (Wb1 \times 10^3)/(Db1 \times Wp \times S) \qquad \text{formula (1)}$$

$$Tb2\ [\text{nm}] = (Wb2 \times 10^3)/(Db2 \times Wp \times S) \qquad \text{formula (2)}$$

5 Claims, 9 Drawing Sheets

INJECTION MOLDING COMPOSITION AND PRODUCING METHOD THEREOF

BACKGROUND OF THE INVENTION

1. Field of the Invention

The present invention relates to an injection molding composition and a producing method thereof. Specifically, it relates to the injection molding composition and the producing method thereof that enables to reduce fluctuation of characteristics, and moreover, to improve the characteristics.

2. Description of the Related Art

A powder injection molding method is a method of mold filling by obtaining a compounded mixture wherein binders are compounded in base powder of metal and metal oxide and injecting the mixture into a mold. With this injection molding method, it enables to effectively obtain an intricately-shaped molding in a short time Japanese Patent Application on Publication No. S62-41759 and Japanese Patent Application Publication No. H5-33006 describe about mixing magnetic materials such as a ferrite magnetic powder and the like and plural binders and additives by a kneader and the like, and the mixture thereby obtained is injection molded.

However, in Japanese Patent Application Publication No. S62-41759 and Japanese Patent Application Publication. No. H5-33006, a mixture is obtained by having additives such as binders and the like included, at a specified percentage with respect to the weight of base powder. There was a problem that fluctuation occurred in the flow characteristic of this mixture.

As a result, fluctuation occurred in characteristics of strength and the like of molded articles obtained, by molding the mixture as well. Further, it also affected a characteristic of a sintered body.

SUMMARY OF THE INVENTION

The present invention has been made in view of the problems described above, and has an object to provide an injection molding composition and a producing method thereof that enables to reduce fluctuation of characteristics, and further, to improve the characteristics.

In order to achieve the above purpose, an injection molding composition according to the present invention is characterized in that it comprises a ferrite powder which is a collection of ferrite particles, a first binder and a second binder, wherein a softening point of said second binder is lower than that of said first binder, a weight and a specific surface area of said ferrite powders are represented by Wp [g] and S [m²/g], and a weight and a density of said first binder are represented by Wb1 [g] and Db1 [g/cm³], and a weight and a density of said second binder are represented by Wb2 [g] and Db2 [g/cm²], and a hypothetical thickness Tb of said first binder is calculated by a formula (1) and a hypothetical thickness Tb2 [nm] of said second binder is calculated by a formula (2), and values obtained therefrom of said Tb1 is 2.0 to 15.0 and of said Tb2 is 16.5 to 32.0.

$$Tb1=(Wb1\times 10^3)/(Db1\times Wp\times S) \quad \text{formula (1)}$$

$$Tb2=(Wb2\times 10^3)/(Db2\times Wp\times S) \quad \text{formula (2)}$$

In order to improve characteristics such as a flow characteristic of an injection molding composition, a strength of molded articles which is obtained by molding the composition, and characteristics of a sintered body which is obtained by firing the molded articles and the like, binders are prepared and compounded in base powder and then mixed with to be a mixture. For a favorable flow characteristic for this mixture, it is considered to be achievable that particle surfaces of base powders are covered with binders to preserve a distance among particles so as not to contact each other. Further, it is considered that it might result in a particle aggregation if a distance among particles is too close since particles of base powders tend to contact each other. Further, it causes a strength reduction of molded articles since this aggregation is not bound with binders. Conversely, it is considered that it might result in a density reduction after firing if a distance among particles is too far apart since the filling density of base powders in molded articles reduces.

On the other hand, conventionally, the content percentage of binders was specified with respect to the weight of base powder. However, the necessary quantity of binder to cover the surface of powder particle changes if a specific surface area of powders differs, even if the weight of the base powder is the same. As a result, it causes fluctuation of a flow characteristic of composition and a strength of molded articles and the like when the specific surface area of the base powder changes, if holding the quantity of binder with respect to the weight of the base powder constant.

Further, the specific surface area might differ depending on a particle size distribution, particle shape and pores of particle surface and the like, even if holding the value of average particle size of the base powders constant.

In view of the above, the present invention pays attention to a surface area of all of powders and a volume of binder, and specifies a thickness (hypothetical thickness) within the above-mentioned range in a case of hypothesizing to cover the surface area with binders. In this way, a necessary and sufficient binder is attached to the surface of powder particles and thereby it enables to preserve a distance among particles. Accordingly, it enables to reduce fluctuation of a flow characteristic of composition and further, to obtain a better flow characteristic. As a result, it enables to reduce fluctuation of characteristics (such as a strength of molded articles, a sintered body characteristics and the like) and further, to improve the characteristics.

Furthermore, it is important to combine binders having different properties in order to improve various characteristics such as a flow characteristic of composition, a strength of molded articles and the like.

Therefore, the above hypothetical thickness is determined in relation to a first binder, and a second binder having a lower softening point than that of the first binder. With this, it enables to maximize the binder's performance, and also enables to improve the various characteristics. Further, conflicting characteristics (such as, for example, hydrophilic, hydrophobic and the like) in the first binder and the second binder might be comprised.

Preferably, in said injection molding composition, coated ferrite particles coating the outer circumference of said ferrite particles with said first binder and said second binder exist.

By coating the outer circumference of the ferrite particles with binder, the binder is stably fixed to the surface of the ferrite particles. Therefore, the surface of the ferrite particles is not exposed when mixing. As a result, a flow characteristic of composition improves without contact and aggregation of the ferrite particles each other.

Especially, in case that the second binder exists outside of the first binder, even if the second binder is in a state of flowing, the first, binder is fixed to the surface of ferrite particles and the surface of the ferrite particles is not exposed since a softening point of the second binder is lower than that of the first binder. Therefore, it enables to obtain an injection molding composition having a better flow of characteristic since the ferrite particles are dispersed without aggregation of the ferrite particles each other.

For the molded articles obtained, by molding such composition a strength of the molded articles gets higher since binders exist sufficiently among ferrite particles. Further, it shows less biased distribution of particles in the molded articles since the aggregation of the ferrite powder is reduced. Therefore, for the sintered body obtained by firing such molded articles, fluctuation of density for each piece becomes small and fluctuation of saturation magnetic flux density becomes small as well.

Preferably, said S is 1 to 5. The above-mentioned effects can be improved by making a specific surface area of base powders within the above range.

Further, a method of producing the injection molding composition according to the present invention comprising a step of obtaining a mixture by mixing a ferrite powder, a first binder and a second binder, wherein a softening point of said second binder is lower than that of said first binder, a weight and a specific surface area of said ferrite powders are represented by Wp [g] and S [m$^2$/g], and a weight and a density of said first binder are represented by Wb1 [g] and Db1 [g/cm$^3$], and a weight and a density of said second binder are represented by Wb2 [g] and Db2 [g/cm$^3$], and a hypothetical thickness Tb1 [nm] of said first binder is calculated by a formula (1) and a hypothetical thickness Tb2 [nm] of said second binder is calculated by a formula (2), and values obtained therefrom of said Tb1 is 2.0 to 15.0 and of said Tb2 is 16.5 to 32.0.

$$Tb1=(Wb1\times10^3)/(Db1\times Wp\times S) \quad \text{formula (1)}$$

$$Tb2=(Wb2\times10^3)/(Db2\times Wp\times S) \quad \text{formula (2)}$$

Based on the above formulae (1) and (2), by determining the content of the first binder and the second binder and by mixing them with base powders, a necessary and sufficient binder is attached to the surface of powder particles and thereby it enables to appropriately preserve a distance among particles. With this, it enables to reduce fluctuation of a flow characteristic of composition, and also to obtain a better flow characteristic. As a result, it enables to reduce fluctuation of characteristics (such as a strength of molded articles, a sintered body characteristic and the like) and further, it enables to improve the characteristics.

DETAILED DESCRIPTION OF THE INVENTION

The following is the explanation of the present invention on the basis of embodiments shown in Figures.

(Injection Molding Compositions)

An injection molding composition according to the present embodiment comprises ferrite powders which are collections of ferrite particles, a first binder and a second binder. In the present embodiment, it is preferable that the ferrite particles are coated with the first binder and the second binder.

(Coated Ferrite Particles)

Figure 1A:
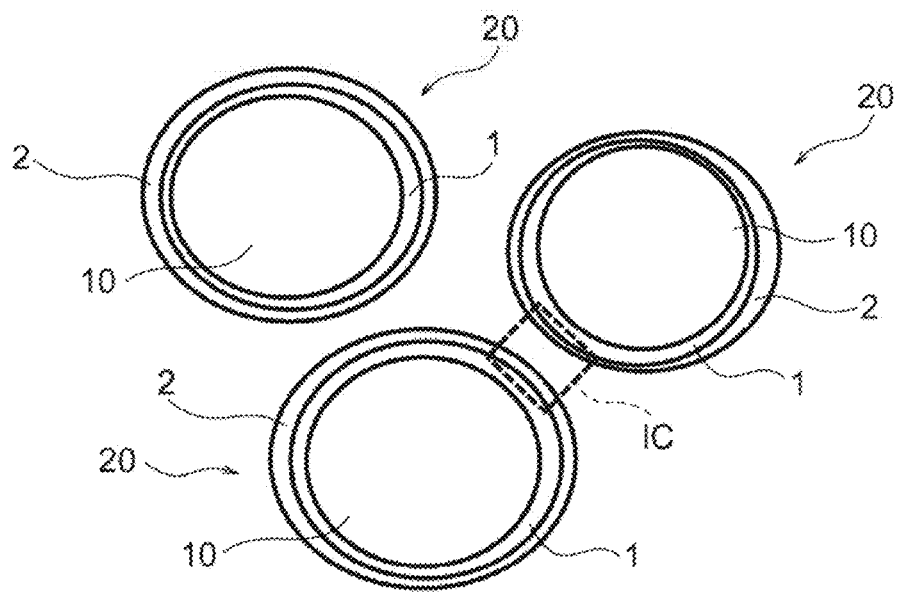
FIG. 1A is a schematic cross-sectional view of coated ferrite particles in injection molding compositions according to an embodiment of the present invention.

As a coated ferrite particle, it might have a configuration that the surface of ferrite particles is coated with a second binder, and the second binder is coated with a first binder. However, in the present embodiment, as shown in FIG. 1A, it exemplifies a configuration that the first binder coats the outer circumference of ferrite particles and the second binder coats the outer circumference of the first binder.

If a specific surface area of ferrite powders is represented by S [m$^2$/g] and a weight of ferrite powders is represented by Wp [g], a surface area of the ferrite powders as a whole is obtained by the following formura, Wp×S [m$^2$]. This value may be deemed to be a total of the surface area of ferrite particles as a whole included in ferrite powders. In the present embodiment, it is hypothesized that the first binder and the second binder are formed in thickness of Tb1 [nm] and Tb2 [nm] with respect to the surface area (Wp×S).

Figure 1B:
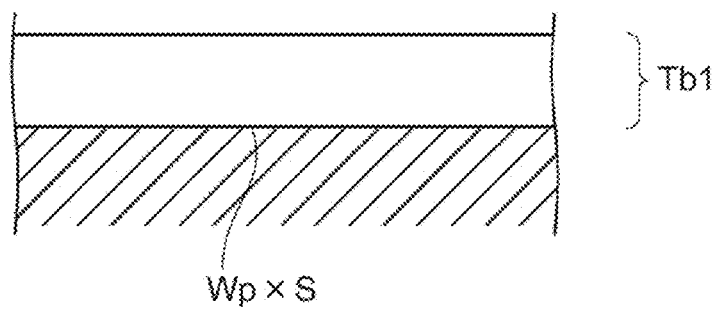
FIG. 1B is a schematic cross-sectional view explaining a hypothetical thickness Tb1.

As shown in FIG. 1B, the first binder is formed in thickness of Tb1 with respect to the surface area (Wp×S). Therefore, the volume Vb1 [m$^3$] of the first binder is obtained by the following formula, Wp×S×Tb1×10$^{-9}$.

On the other hand, the volume Vb1 of the first binder is obtained by the formula for dividing the weight Wb1 [g] of the first binder by the density Db1 [g/cm$^3$].

Therefore, the formula that is Wp×S×Tb1×10$^{-9}$=(Wb1/Db1×10$^6$) can be satisfied. With this, the thickness Tb1 can be obtained by the formula (1) that is Tb1=Wb1×10$^3$/Db1×Wp×S). Likewise, the thickness Tb2 of the second binder can be obtained by the formula (2) that is Tb2=Wb2×10$^3$/(Db2×Wp×S).

In this way, in the present embodiment, a hypothetical thickness, when uniformly coating the specific surface area of powders as a whole with binders, is represented by Tb1 and Tb2.

In the present embodiment, Tb1 is 2.0 to 15.0 nm, preferably 4.0 to 15.0 nm in and more preferably 6.0 to 15.0 nm. Further, Tb2 is 16.5 to 32.0 nm, preferably 16.5 to 28.0 nm and more preferably 20.0 to 28.0 nm.

By making the hypothetical thickness of Tb1 and Tb2 within the above range, it enables to appropriately maintain a distance among ferrite particles and reduce fluctuation of characteristics such as flow characteristic and the like.

(Ferrite Powders)

A composition of ferrite powders is not specifically limited and can be determined in accordance with a desired characteristic. Further, in the present embodiment, a specific surface area. S [$m^2/g$] of ferrite powders is preferably 1 to 5.

A measuring method of the specific surface area is not specifically limited, but it is preferable to calculate the specific surface area by BET method.

(First Binder)

A first binder is not specifically limited if it has a higher softening point than that of after-mentioned second binder. In the present embodiment, the first binder is preferably hydrophilic.

By coating the surface ferrite particles with the first binder, the first binder intervenes among ferrite particles. As a result, it enables to prevent an aggregation of ferrite particles without contacting ferrite particles each other. Accordingly, a flow characteristic of composition improves and a characteristic of injection molding improves as well. Further, a strength of molded articles gets higher since ferrite particles are uniformly dispersed. Furthermore, it becomes possible to reduce fluctuation of sintered body density and of saturation magnetic flux density for each piece.

A softening point of the first binder is preferably 150 to 250° C.

In the present embodiment, the softening point is a temperature that a binder gets soft and becomes easily movable among particles. Further, although the concept of the softening point is almost the same with a melting point of binders, it might be a glass transition point.

In the present embodiment, as a specific first binder, high polymer materials such as polyvinyl acetate, polyvinyl chloride, nylon6, acryl resin and the like are exemplified.

(Second Binder)

A second hinder is not specifically limited if it has a lower softening point than that of a first binder. The second binder is preferably hydrophobic. If materials (such as wax and the like) other than the first binder and the second binder are added to compositions, the materials generally exist outside of the second binder. As a result, if the second binder is hydrophilic, a mixing condition with the above materials tends to get worse.

A softening point of the second binder is preferably 70 to 200° C.

In the present embodiment, as a specific second binder, high polymer materials such as high density polyethylene, polypropylene, polyacetal, polystyrene and the like are exemplified.

Further, in the actual injection molding composition, different from a coated ferrite particle in FIG. 1A, a boundary between the first binder and the second binder does not always reveal its presence in a state that is clearly recognized, and also it is considered that the thickness does not always stay constant. Further, all of ferrite particles in the injection molding composition do not have to be coated with the first binder and the second binder. Ferrite particles coated only with the first binder and ferrite particles coated only with the second binder might exist.

In the present embodiment, binders having a particular characteristic are divided into two categories, a first binder and a second binder, and a hypothetical thickness of each binder is determined. With this, it enables to maximize the performance of binders. Accordingly, it also enables to improve an accuracy of dimension since the quantity of binder can be reduced by keeping it to a minimum.

Further, in the present embodiment, a desired binder should be preferentially applied to a particle surface in consideration of a reactivity of the particle surface with the binders.

For example, if a first binder is hydrophilic, a hydrophilic material is more likely to absorb moisture. Therefore, if a second binder does not, exist or a second binder is hydrophilic, a flow characteristic of composition might result in changing with time. With this, a first, binder can be protected from outside moisture by coating a hydrophilic first binder with a hydrophobic second binder. As a result, a flow characteristic of composition as a whole can be improved.

In the present embodiment, it is preferable that an injection molding composition additionally comprises a wax.

Figure 1C:
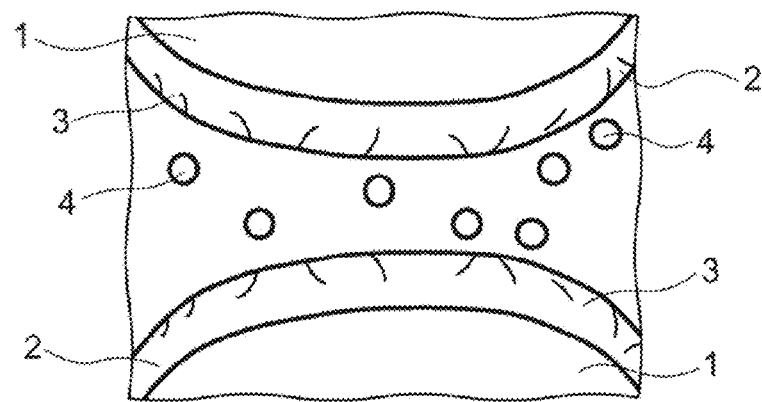
FIG. 1C is an enlarged view of IC portion in FIG. 1A.

In the present embodiment, as shown in FIG. 1C, the wax exists by permeating the surface of second binder. Therefore, a flow characteristic of composition can be improved and further, a release characteristic when molding can be improved as well. As a specific wax, synthetic waxes such as paraffin wax, urethanated wax, polyethylene glycol and the like other than natural waxes such as carnauba wax, montan wax, beeswax and the like are used.

In the present embodiment, the injection molding composition might comprise other components in accordance with a desired characteristic. For example, it might comprise a plasticizer.

As shown in FIG. 1C, the plasticizer exists among binder molecules coating ferrite particles. With this, it enables to preserve a distance among ferrite particles and also to improve the above-mentioned effects.

As a specific plasticizer, for example, phthalate ester is used, and diisodecyl phthalate, dilauryl phthalate, butyl lauryl phthalate, di-n-octyl phthalate, bis phthalate (2-ethylhexyl) (DOP) and the like are preferable.

(Producing Method of Injection Molding Composition)

First, ferrite powders as a base powder, a first binder and a second binder need to be prepared. In the present embodiment, it is preferable to prepare a wax, and a plasticizer might be prepared as necessary.

As a ferrite powder, oxide might be used and also compounds that turns into oxides after firing might be used. The ferrite powder might be calcined as necessary.

In the present embodiment, an injection molding composition is produced by using a kneader. First, a first binder and a second binder need to be weighted to make the thickness of Tb1 and Tb2 within the above-mentioned range, in view of the weight (Wp) and the specific surface area (S) of ferrite powder. Next, the weighted ferrite powders, the first binder and the second hinder are put into the kneader to mix. The condition such as rotation frequency, mixing time, mixing temperature and the like should be appropriately determined. Further, the order of putting binders might be changed.

In the present embodiment, it is preferable to add a wax after mixing the ferrite powders, the first hinder and the second binder. The content of wax should be determined to satisfy the above-mentioned range. Further, the condition such as rotation frequency, mixing time, mixing temperature and the like should be appropriately determined.

By going through the above process, the injection molding composition wherein ferrite particles coated with the first binder and the second binder exists can be obtained. Further, a flow characteristic of the composition can be improved by the wax, and a release characteristic when molding can be sufficiently ensured. For the obtained injection molding composition, it is preferable to convert it into pellet form by using a pelletizer and the like.

In the present embodiment, the above-mentioned pellet is put in the injection molding equipment, and then a ceramic injection molding (CIM) is processed.

The pellet put in the injection molding equipment turns into a material for molding by being dissolved with heating at temperature, for example, of 160 to 230 and by being mixed. And then, the material is injected into a cavity which is a mold apparatus by a screw to produce molded articles. The temperature of mold apparatus is 20 to 80° C. A magnetic field might be applied to the mold apparatus as necessary.

After that, a delipidation process is performed to the obtained molded articles. The condition for the delipidation process is not specifically limited. Therefore, it can be performed in accordance with the conditions known in the art.

Molded articles after the delipidation process are tired, and thereby a sintered body is produced. The condition for firing is not specifically limited. Therefore, it can be performed in accordance with the conditions known in the art. For example, the firing temperature is preferably about 1200° C.

The sintered body obtained through the above process is processed as necessary and turns into a soft ferrite, core, for example.

Further, the present invention is not limited to the embodiment as mentioned above, and it can be altered variously within the scope of the present invention.

EXAMPLES

The following is the explanation of the present invention based on the examples which are more detail. However, the present invention is not hunted to these examples.

Example 1

As a base powder, a soft ferrite powder 1 with a BET specific surface area (S) of 1.5 m$^2$/g and a soft ferrite powder 2 with a BET specific surface area (S) of 3.7 m$^2$/g were prepared. Further, the followings were prepared; acryl resin as a first binder, polyethylene as a second binder, paraffin wax as a wax, and dioctyl phthalate (DOP) as a plasticizer.

(Sample 1)

First, a composition including 2.75 wt % of first binder, 6.93 wt % of second binder, 3.47 wt % of wax and 1.27 wt % of plasticizer with respect to a ferrite powder 1 were put into the kneader and mixed. It was mixed under the condition of rotation frequency of 16 rpm, 2 hours mixing time, and mixing temperature of 195° C. to obtain an injection molding composition. For the obtained injection molding composition, a flow characteristic (MVR) was measured with the condition of 200° C. and 10 kg, and further this composition was converted into pellet form by using a pelletizer. The result is shown in Table 1.

Next, the pellet was put into an injection molding equipment and was injection molded in a mold apparatus after being dissolved, with heating and mixed. The thickness of the molded articles after the process of injection molding is 2 mm and a circular arc flat plate was molded.

The strength of the obtained molded articles was evaluated by measuring a breaking load as shown below.

The breaking load was calculated by the load when the molded articles broke, as a result of supporting both ends of the molded articles, and gradually increasing a concentrated load in the middle of the molded articles from the value 0N. The breaking load calculated as above was recognized as a strength of molded articles. The result is shown in Table 1.

Next, the molded articles were delipidated. After that, the temperature was turned up to 1200° C. and kept the molded articles with this temperature for one hour. From this process, a soft ferrite sintered body was obtained (firing process).

For the obtained soft ferrite sintered body, a sintered body density and a saturation magnetic flux density were evaluated. The result is shown in Table 1.

(Sample 2)

Further, for a ferrite powder 2, a soft ferrite sintered body was obtained by producing an injection molding composition with applying the same blending quantity and the same condition of ferrite powder 1, and by using the composition thereby obtained as the same with the case of ferrite powder 1. For a flow characteristic, a strength of molded article, a sintered body density and a saturation magnetic flux density, they were evaluated in the same way with the ferrite powder 1. The result is shown in Table 1.

(Sample 3 and 4)

Next, the blending quantity was determined so that Tb1 is to be 8.0 nm and Tb2 is to be 24.0 nm with respect to the ferrite powder 1 (sample 3) and the ferrite powder 2 (sample 4). A soft ferrite sintered body was produced as the above and the characteristics were evaluated. The result is shown in Table 1.

TABLE 1

| Name of Sample | Ferrite Powder Specific Surface Area (m$^2$/g) | Composition Flow Characteristic (cc/10 min) | Molded Articles Strength of Molded Articles (N) | Sintered Body Saturation Magnetic Flux Density (mT) | Sintered Body Density (g/cm$^3$) |
|---|---|---|---|---|---|
| Sample 1 | 1.5 | 893.0 | 85.0 | 161.5 | 4.65 |
| Sample 2 | 3.7 | 134.0 | 20.0 | 195.1 | 4.79 |
| Sample 3 | 1.5 | 87.1 | 40.5 | 208.3 | 4.90 |
| Sample 4 | 3.7 | 71.8 | 43.4 | 217.0 | 4.93 |

From Table 1, it could be confirmed that fluctuation of characteristics becomes large, when compounding simply in accordance with a weight percent (sample 1 and 2) without taking a specific surface area into account with respect to powders (ferrite powder 1, ferrite powder 2) having different specific surface areas.

On the other hand, it could be confirmed that fluctuation of characteristics becomes small, when compounding so that Tb1 and Tb2 stay constant (sample 3 and 4) in accordance with a specific surface area of ferrite powder.

Example 2

As a base powder, a soft ferrite powder with a BET specific surface area (S) of 1.5 m$^2$/g were prepared for the quantity of 1000 g(Wp). Further, the followings were prepared: acryl resin as a first binder, polyethylene as a second binder, paraffin wax as a wax, and dioctyl phthalate (DOP) as a plasticizer.

Further, a density Db1 of the first binder was 1.19 g/cm³ and a density Db2 of the second binder was 0.9 g/cm³.

The weights of the first binder and the second binder were determined so that Tb1 is to be 0.5 to 20.0 nm and Tb2 is to be 15.5 to 32.0 nm in accordance with the weight (Wp) and the specific surface area (S) of the above ferrite powder and the density (Db1 and Db2) of the first binder and the second binder.

Figure 2:
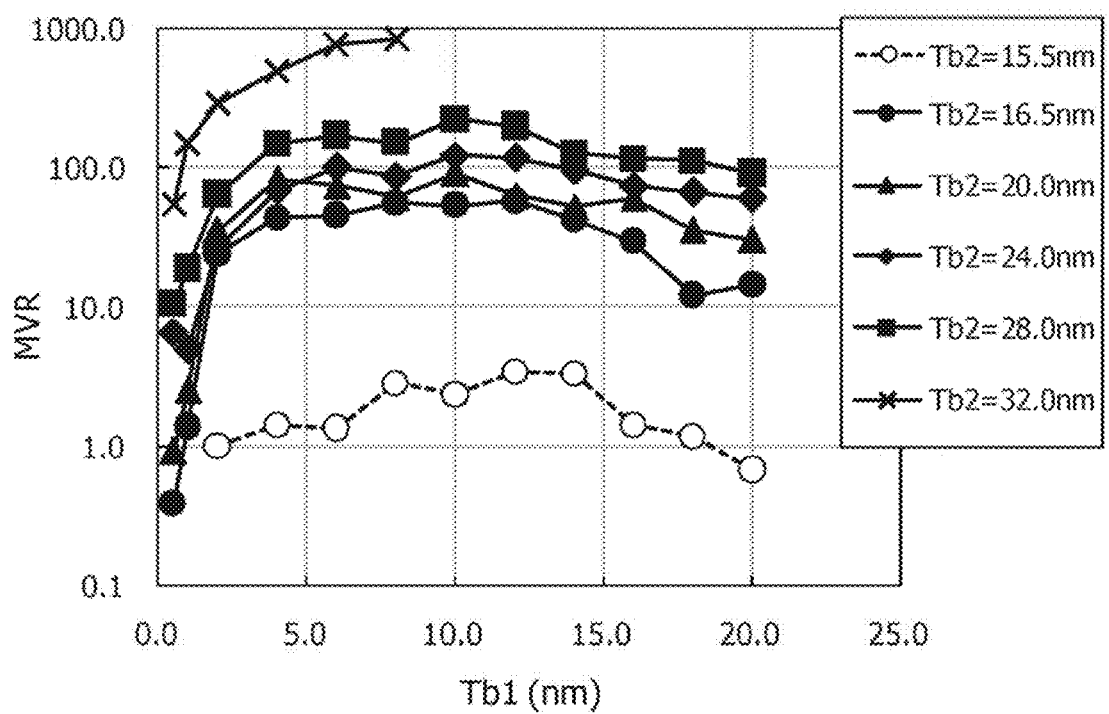
FIG. 2 is a chart showing the relationship between Tb1 and a flow characteristic of injection molding compositions in regard to samples according to examples and comparative examples of the present invention.

The ferrite powders having weight of Wp(g), the first hinder and the second binder in the quantity determined above, 30 g of wax, 0.01 mole of DOP were put in a kneader and mixed under the condition of rotation frequency of 16 rpm, 2 hours mixing time, mixing temperature of 195° C. to obtain an injection molding composition. For the obtained injection molding composition, a flow characteristic (MVR) was measured with the same condition of Example 1 and further, this composition was converted into pellet form by using a pelletizer. The measurement result of a flow characteristic is shown in FIG. 2. In FIG. 2, it shows a graph indicating a transition along with the change of Tb2, with a horizontal axis representing Tb1 and a vertical axis representing a flow characteristic. Further, MVR is preferably 10 or larger.

Figure 3:
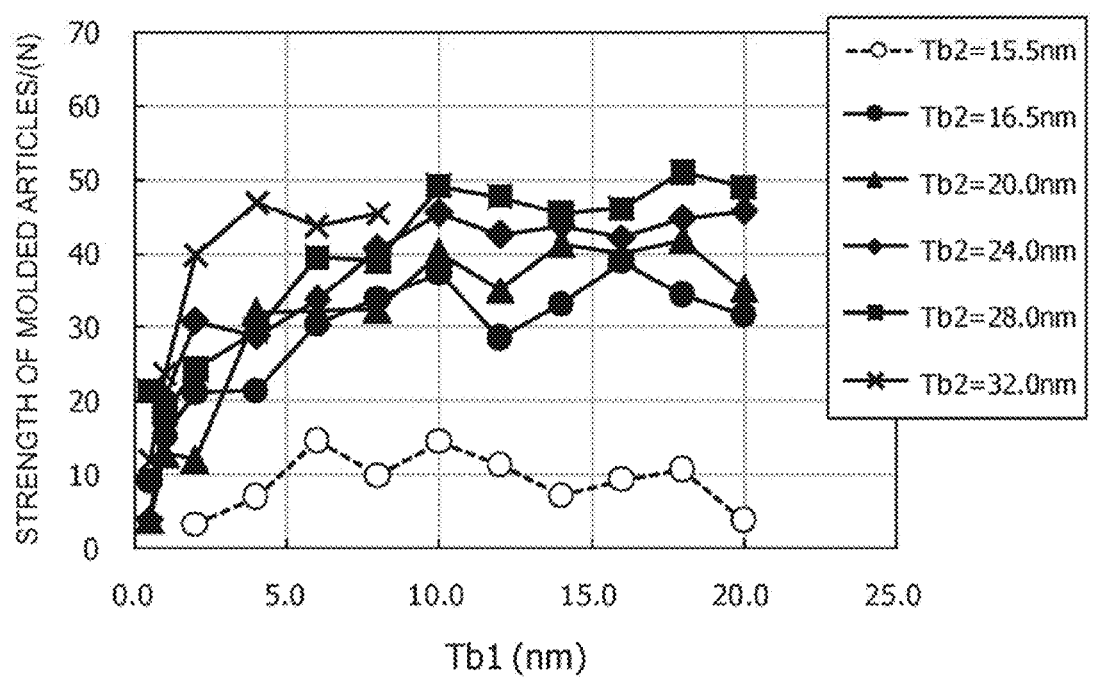
FIG. 3 is a chart showing the relationship between Tb1 and a strength of molded articles in regard to samples according to examples and comparative examples of the present invention.
Figure 4:
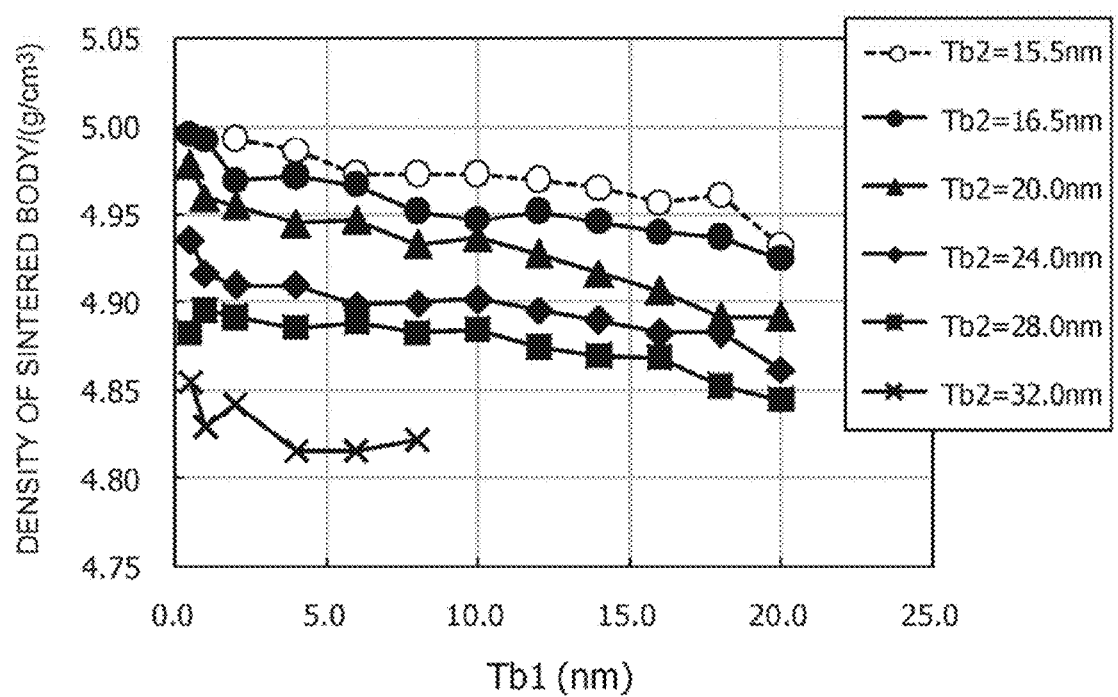
FIG. 4 is a chart showing the relationship between Tb1 and a density of a sintered body in regard to samples according to examples and comparative examples of the present invention.
Figure 5:
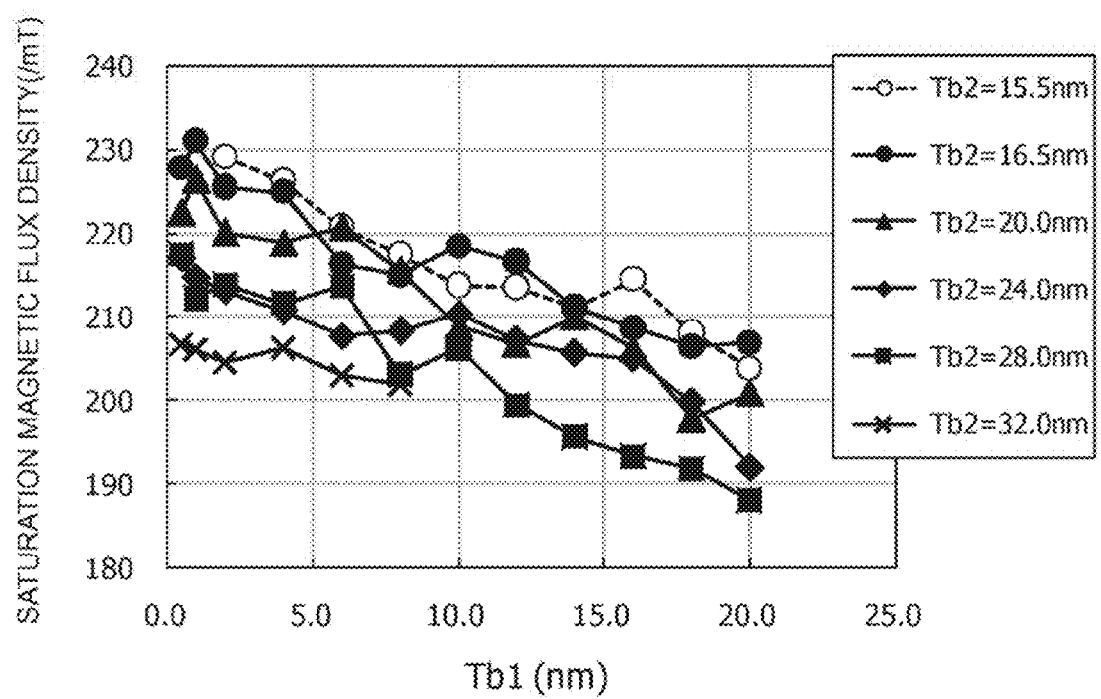
FIG. 5 is a chart showing the relationship between Tb1 and a saturation magnetic flux density of a sintered body in regard to samples according to examples and comparative examples of the present invention.
Figure 6:
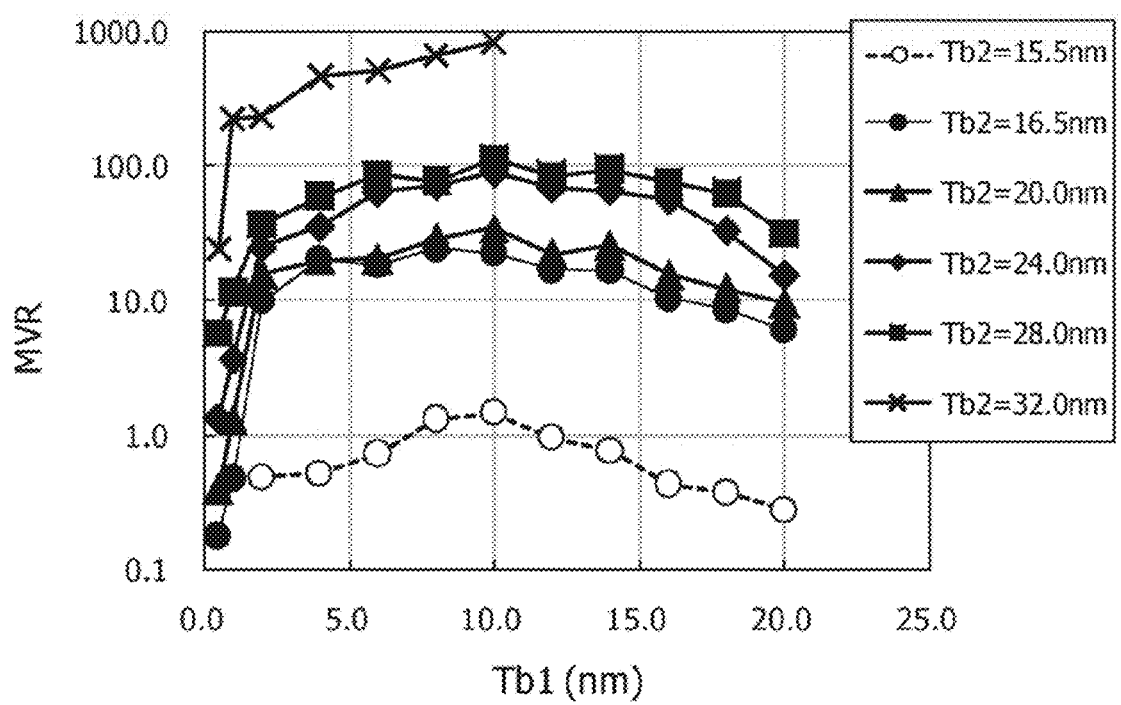
FIG. 6 is a chart showing the relationship between Tb1 and a flow characteristic of injection molding compositions in regard to samples according to examples and comparative examples of the present invention.
Figure 7:
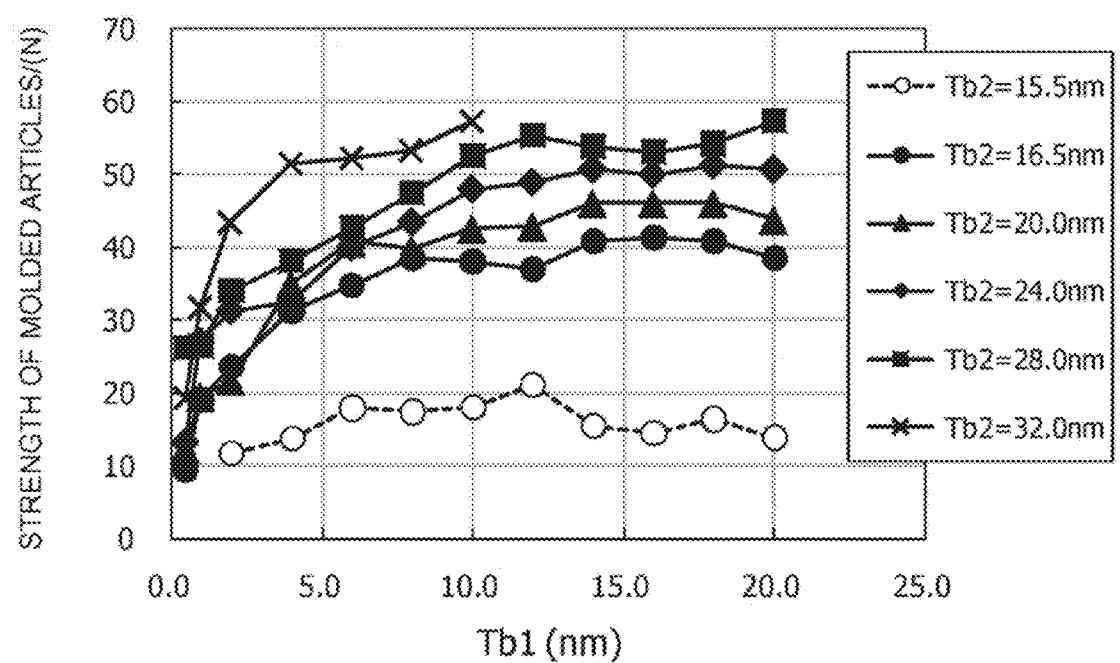
FIG. 7 is a chart showing the relationship between Tb1 and a strength of molded articles in regard to samples according to examples and comparative examples of the present invention.
Figure 8:
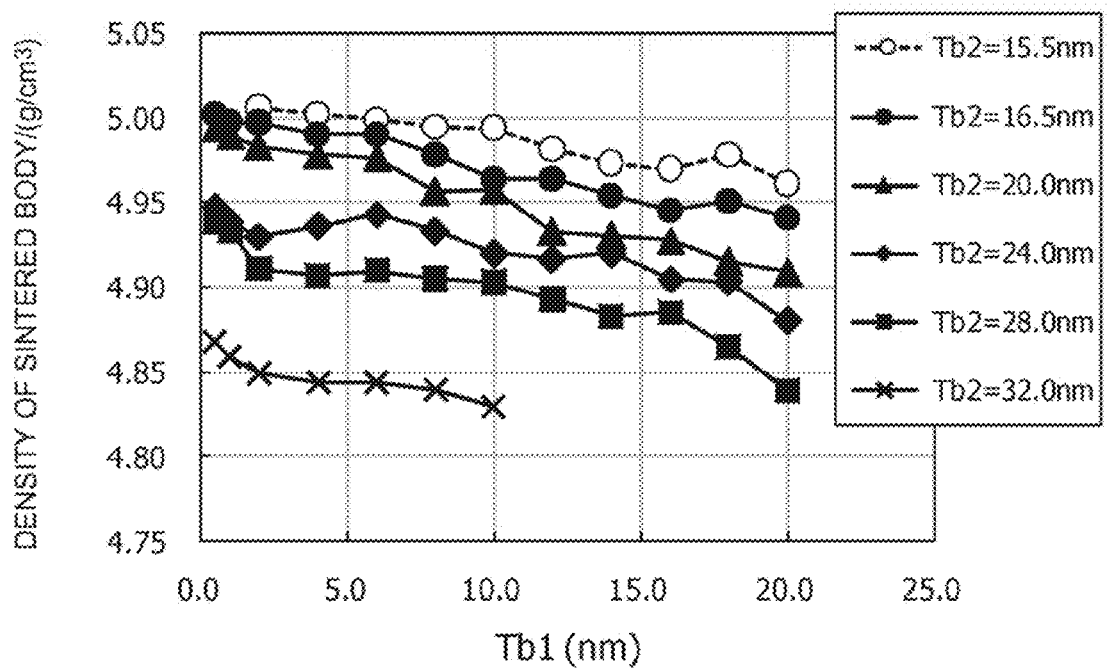
FIG. 8 is a chart showing the relationship between Tb1 and a density of a sintered body in regard to samples according to examples and comparative examples of the present invention.
Figure 9:
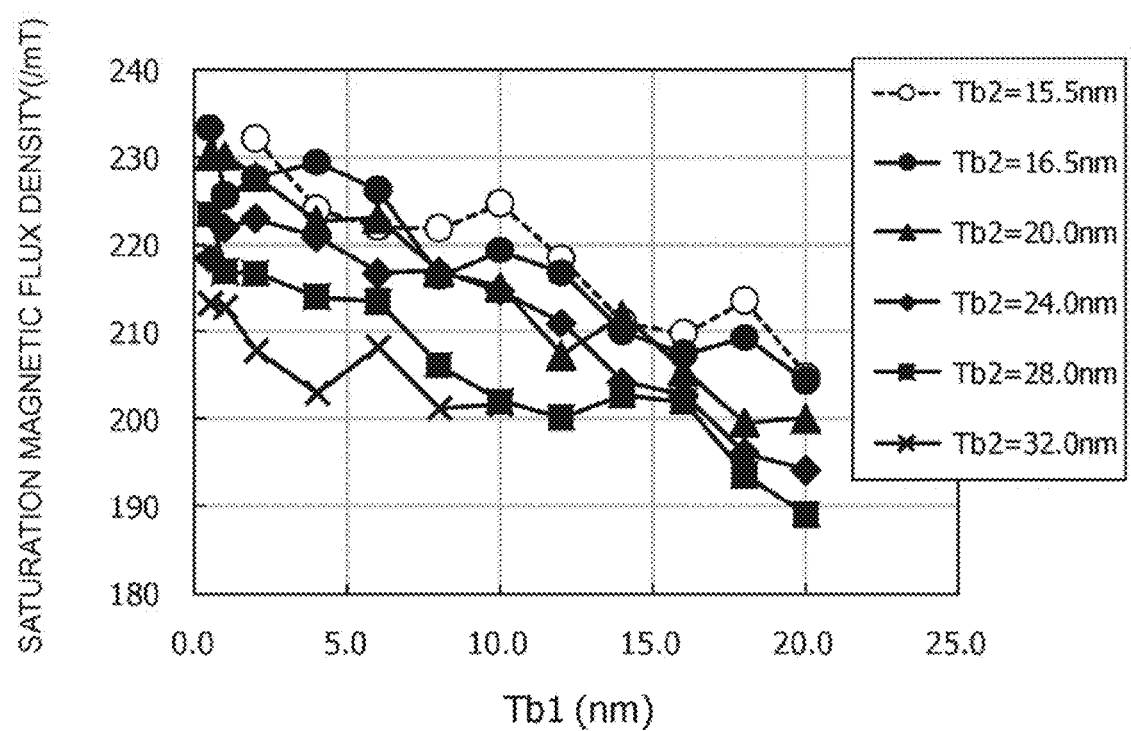
FIG. 9 is a chart showing the relationship between Tb1 and a saturation magnetic flux density of a sintered body in regard to samples according to examples and comparative examples of the present invention.

Next, the obtained injection molding composition was molded and fired in the same way with Example 1 to obtain a sintered body. For the molded articles and the sintered body, they were evaluated as the same with Example 1. The result is shown in FIGS. 3 to 5. In FIG. 3, it shows a graph indicating a transition along with the change of Tb2, with a horizontal axis representing Tb1 and a vertical axis representing a strength of the molded articles. In FIG. 4, it shows a graph indicating a transition along with the change of Tb2, with a horizontal axis representing Tb1 and a vertical axis representing a sintered body density. In FIG. 5, it shows a graph indicating a transition along with the change of Tb2, with a horizontal axis representing Tb1 and a vertical axis representing a saturation magnetic flux density.

From FIGS. 2 to 5, it could be confirmed that it enables to reduce fluctuation of characteristics, and further, to obtain better characteristics (flow characteristic, strength of molded articles, saturation magnetic flux density, density and the like) by making Tb1 and Tb2 within the above-mentioned range.

Example 3

As a base powder, a soft ferrite powder with a BET specific surface area (S) of 3.7 m²/g were prepared for the quantity of 1000 g(Wp). Further, the followings were prepared; acryl resin as a first binder, polyethylene as a second binder, carnauba wax as a wax and butyl lauryl phthalate as a plasticizer.

Further, a density Db1 of the first hinder was 1.19 g/cm³ and a density Db2 of the second binder was 0.9 g/cm³.

The weight of the first binder and the second hinder was determined so that Tb1 is to be 0.5 to 20.0 nm and Tb2 is to be 15.5 to 32.0 nm in accordance with the weight (Wp) and the specific surface area (S) of the above ferrite powder and the density (Db1 and Db2) of the first binder and the second binder.

The first binder and the second binder in the quantity determined above, and wax and plasticizer were added to the ferrite powder in the same way with Example 2 to produce an injection molding composition. Further, a soft ferrite was produced and then evaluated as the same with Example 1. The result is shown in FIGS. 6 to 9.

From FIGS. 6 to 9, it could be confirmed that a similar result was achieved with Example 2.

The invention claimed is:

1. An injection molding composition comprising:
a soft ferrite powder, which is a collection of ferrite particles;
a first binder; and
a second binder,
wherein:
said first binder is hydrophilic;
said second binder is hydrophobic;
a softening point of said first binder is from 150° C. to 250° C.;
a softening point of said second binder is lower than that of said first binder;
a weight and a specific surface area of said ferrite powders are represented by Wp [g] and S [m²/g], a weight and a density of said first binder are represented by Wb1 [g] and Db1 [g/cm³], and a weight and a density of said second binder are represented by Wb2 [g] and Db2 [g/cm³];
said S is 1.5 to 3.7; and
a hypothetical thickness Tb1 [nm] of said first binder is calculated by a formula (1) and a hypothetical thickness Tb2 [nm] of said second binder is calculated by a formula (2), and values obtained therefrom of said Tb1 is 2.0 to 15.0 and of said Tb2 is 16.5 to 32.0:

$$Tb1=(Wb1\times 10^3)/(Db1\times Wp\times S) \quad \text{formula (1)}$$

$$Tb2=(Wb2\times 10^3)/(Db2\times Wp\times S) \quad \text{formula (2).}$$

2. The injection molding composition as set forth in claim 1, further comprising coated ferrite particles that are coated by said first binder and said second binder.

3. A method of producing an injection molding composition comprising a step of obtaining a mixture by mixing a soft ferrite powder, a first binder and a second binder, wherein:
said first binder is hydrophilic;
said second binder is hydrophobic;
a softening point of said first binder is from 150° C. to 250° C.;
a softening point of said second binder is lower than that of said first binder,
a weight and a specific surface area of said ferrite powders are represented by Wp [g] and S [m²/g], a weight and a density of said first binder are represented by Wb1 [g] and Db1 [g/cm³], and a weight and a density of said second binder are represented by Wb2 [g] and Db2 [g/cm³];
said S is 1.5 to 3.7; and
a hypothetical thickness Tb1 [nm] of said first binder is calculated by a formula (1) and a hypothetical thickness Tb2 [nm] of said second binder is calculated by a formula (2), and values obtained therefrom of said Tb1 is 2.0 to 15.0 and of said Tb2 is 16.5 to 32.0:

$$Tb1=(Wb1\times 10^3)/(Db1\times Wp\times S) \quad \text{formula (1)}$$

$$Tb2=(Wb2\times 10^3)/(Db2\times Wp\times S) \quad \text{formula (2).}$$

4. An injection molding composition comprising:
a soft ferrite powder, which is a collection of ferrite particles;
a first binder; and
a second binder,
wherein:

said first binder is a high polymer material selected from the group consisting of polyvinyl acetate, polyvinyl chloride, nylon6, and acryl resin;

said second binder is a high polymer material selected from high density polyethylene, polypropylene, polyacetal, and polystyrene;

a weight and a specific surface area of said ferrite powders are represented by Wp [g] and S [m²/g], a weight and a density of said first binder are represented by Wb1 [g] and Db1 [g/cm³], and a weight and a density of said second binder are represented by Wb2 [g] and Db2 [g/cm³];

said S is 1.5 to 3.7; and a hypothetical thickness Tb1 [nm] of said first binder is calculated by a formula (1) and a hypothetical thickness Tb2 [nm] of said second binder is calculated by a formula (2), and values obtained therefrom of said Tb1 is 2.0 to 15.0 and of said Tb2 is 16.5 to 32.0:

$$Tb1 = (Wb1 \times 10^3)/(Db1 \times Wp \times S) \quad \text{formula (1)}$$

$$Tb2 = (Wb2 \times 10^3)/(Db2 \times Wp \times S) \quad \text{formula (2)}.$$

5. A method of producing an injection molding composition comprising a step of obtaining a mixture by mixing a soft ferrite powder, a first binder, and a second binder, wherein:

said first binder is a high polymer material selected from the group consisting of polyvinyl acetate, polyvinyl chloride, nylon6, and acryl resin;

said second binder is a high polymer material selected from high density polyethylene, polypropylene, polyacetal, and polystyrene;

a weight and a specific surface area of said ferrite powders are represented by Wp [g] and S [m²/g], a weight and a density of said first binder are represented by Wb1 [g] and Db1 [g/cm³], and a weight and a density of said second binder are represented by Wb2 [g] and Db2 [g/cm³];

said S is 1.5 to 3.7; and a hypothetical thickness Tb1 [nm] of said first binder is calculated by a formula (1) and a hypothetical thickness Tb2 [nm] of said second binder is calculated by a formula (2), and values obtained therefrom of said Tb1 is 2.0 to 15.0 and of said Tb2 is 16.5 to 32.0:

$$Tb1 = (Wb1 \times 10^3)/(Db1 \times Wp \times S) \quad \text{formula (1)}$$

$$Tb2 = (Wb2 \times 10^3)/(Db2 \times Wp \times S) \quad \text{formula (2)}.$$

\* \* \* \* \*